E. G. LIDDY.
SLED ATTACHMENT FOR MOTOR VEHICLES.
APPLICATION FILED JULY 10, 1917.

1,261,567.

Patented Apr. 2, 1918.
2 SHEETS—SHEET 1.

WITNESSES

J H Crawford
R M Smith

INVENTOR
E. G. Liddy,

BY Victor J. Evans
ATTORNEY

E. G. LIDDY.
SLED ATTACHMENT FOR MOTOR VEHICLES.
APPLICATION FILED JULY 10, 1917.
1,261,567.
Patented Apr. 2, 1918.
2 SHEETS—SHEET 2.
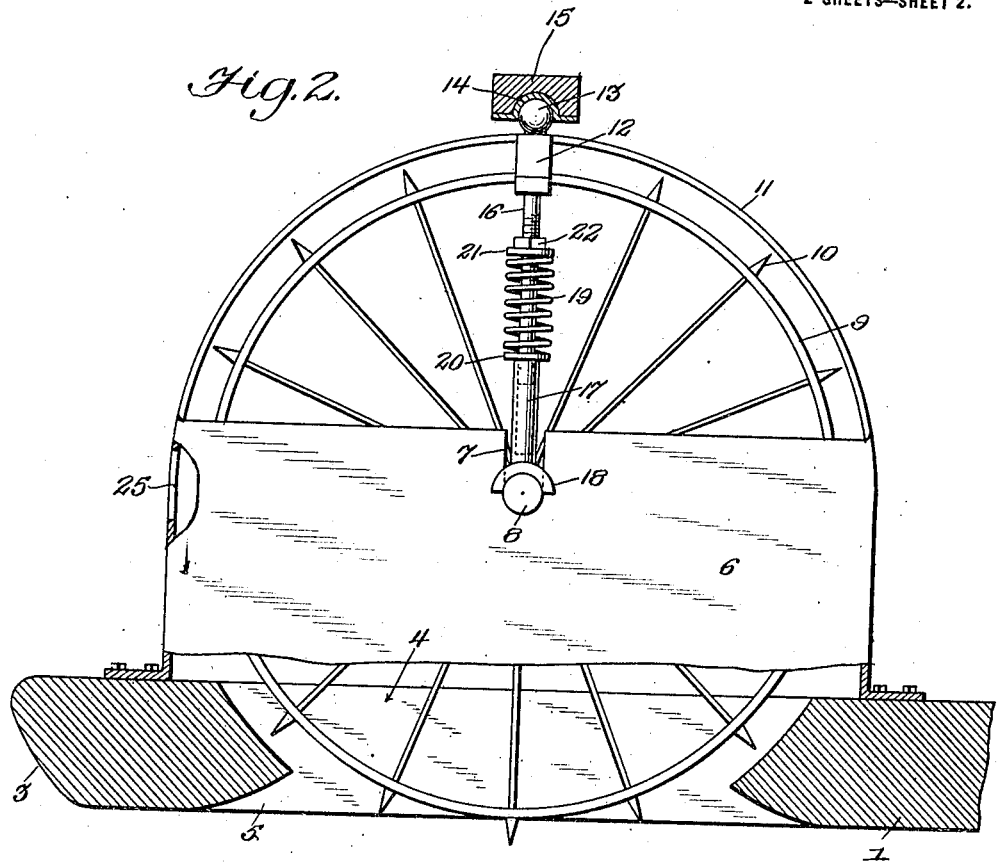
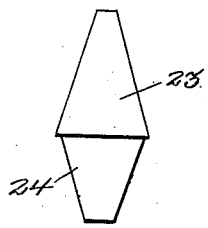
Fig. 4.
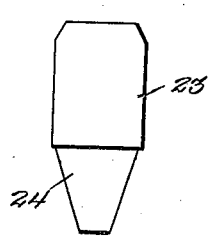
Fig. 5.
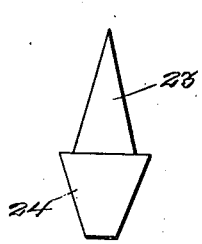
Fig. 6.
WITNESSES
J.H.Crawford.
R.M.Smith.
INVENTOR
E.G.Liddy,
BY Victor J. Evans
ATTORNEY

UNITED STATES PATENT OFFICE.

EARL G. LIDDY, OF ARKANSAW, WISCONSIN.

SLED ATTACHMENT FOR MOTOR-VEHICLES.

1,261,567.  Specification of Letters Patent.  Patented Apr. 2, 1918.

Application filed July 10, 1917. Serial No. 179,720.

*To all whom it may concern:*

Be it known that I, EARL G. LIDDY, a citizen of the United States, residing at Arkansaw, in the county of Pepin and State of Wisconsin, have invented new and useful Improvements in Sled Attachments for Motor-Vehicles, of which the following is a specification.

This invention relates to sled attachments for motor vehicles, the broad object in view being to provide runners and driving means capable of being applied to an automobile or motor vehicle in place of the ordinary steering and driving wheels thereof, enabling the vehicle to be used in the winter season as well as in the summer season.

One of the chief objects of the present invention is to produce a sled attachment especially adapted to take the place of one of the driving wheels of the machine, said sled attachment being equipped with driving means and also means for insuring the proper traction of the driving mechanism and the yielding thereof to prevent injury when the driving wheel comes in contact with a hard object or an uncovered road surface.

A further object of the invention is to provide tensioning means whereby the degree of traction of the driving wheels of the sled attachment may be varied in accordance with the load imposed upon the vehicle.

Another object of the invention is to make provision whereby the traction spikes or calks may be removed and replaced without dismantling the structure of the sled attachment.

With the above and other objects in view, the invention consists in the novel construction, combination and arrangement of parts, herein described, illustrated and claimed.

In the accompanying drawings:—

Fig. 2 is an enlarged side elevation partly in section of one of the rear sled attachments or runners.

Figs. 4, 5 and 6 are detail views of one of the traction spikes or calks.

Figure 1:
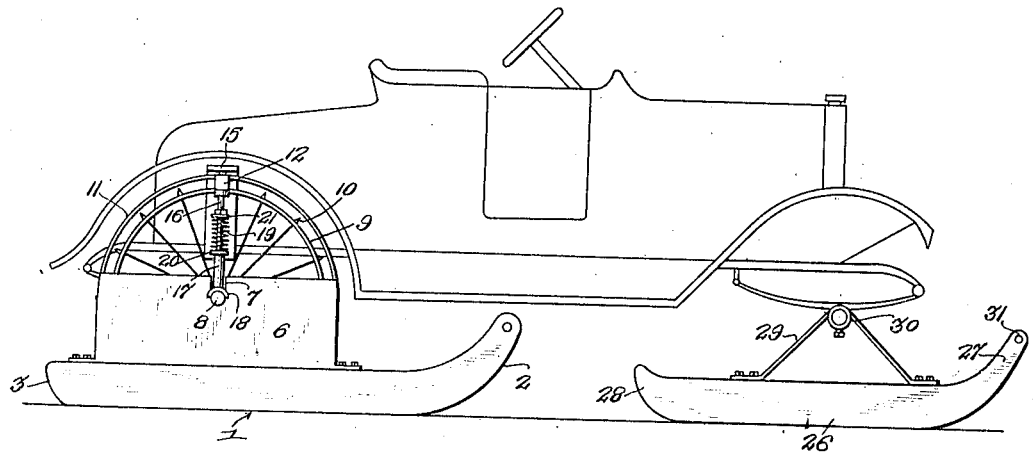
Figure 1 is a side elevation of a motor vehicle showing the sled attachments in their applied relation thereto.

In carrying out the present invention, I employ four sled attachments or runners, one for each wheel of the vehicle. Each rear sled attachment comprises a runner 1 having an upturned forward end 2 and an upwardly curving rear end 3 to provide for backing the vehicle. Each rear runner 1 is formed with a central longitudinal recess 4 to provide for the traction or driving wheel hereinafter more particularly referred to and the recess 4 which is substantially arcuate in the direction of length of the runner is intersected by other triangular shaped recesses 5 which serve to prevent snow, ice, and other matter from choking and clogging the recess 4 either when the machine is being propelled in a forward or backward direction. In front and in rear of the recesses 4 and 5, the runner 1 is solid in cross section and the forward portion thereof serves to pack the snow in advance of the action of the driving wheel.

Figure 3:
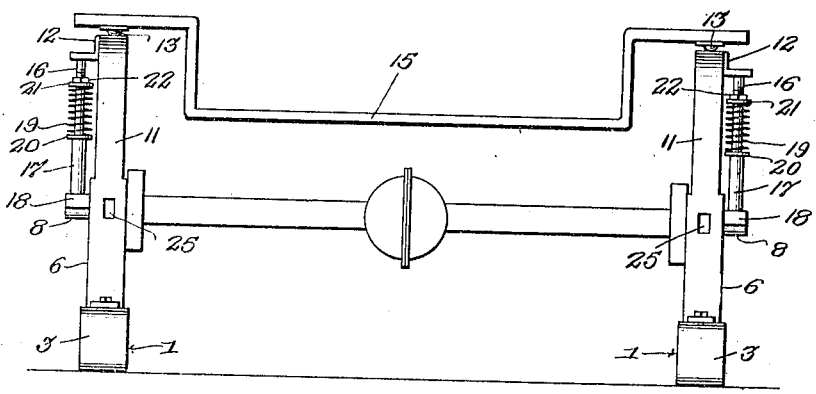
Fig. 3 is a rear elevation, partly in section, of the vehicle.

Extending upwardly from each of the runners 1 is a metal housing 6 substantially rectangular in horizontal section and formed in the opposite side walls thereof with recesses or seats 7 adapted to receive the end portions of the rear driving axle 8 of the motor vehicle. Fast on the axle 8 and mounted within each of the housings 6 is a traction or driving wheel 9 comprising an outer rim and traction spikes or calks 10 projecting therefrom and arranged at suitable intervals throughout the circumference of the wheel. The housing 6 comprises an arcuate and substantially semi-circular rim or hood 11 which extends over the top of the wheel 9. At the top of the rim or hood 11 is a bearing or supporting member 12 having a rounded head portion 13 which is received in a recess 14 of corresponding shape formed in the under side of a bolster 15 which extends across beneath the body of the vehicle. The supporting or bearing member 12 is offset laterally from the rim or hood 11 as shown in Fig. 3 and extending downwardly therefrom is a stem or guide 16 the lower portion of which is received in a tubular guide 17 having at its lower end an arcuate saddle 18 which rests upon the projecting end of the axle 8. A coiled compression spring 19 is disposed around the stem 16 between a washer 20 which rests against the upper extremity of the tubular guide 17, and another washer 21 which is loose on the stem 16 and adjustable thereon by means of a nut 22 threaded on the stem 16. By adjusting the nut 22 the tension of the spring 19 may be increased or diminished according to the load imposed on the vehicle and the desired pressure required between the traction or driving wheel 9 and the road surface and also in accordance with the character of the road surface which is subject to changes from time to time according to the atmospheric temperature.

The spikes or calks are formed as illustrated in the detail views, Figs. 4, 5 and 6, each of said spikes or calks comprising a frusto-pyramidal projecting portion 23 and a wedge shaped tapering tank 24 which is driven into the rim of the traction wheel 9 with a tight wedging fit. In order to provide for insuring and removing the traction spikes or calks 10, the rear wall of the housing 6 is formed with an opening 25 through which the spikes or calks may be inserted and removed, thereby avoiding the necessity of dismantling the sled structure shown and described.

Each of the front sled attachments, comprises a runner 26 having up-turned front and rear end portions 27 and 28 respectively to provide for propelling the machine in either direction. Each of said runners 26 comprises a knee 29 having a bearing member or shackle 30 adapting it to be mounted upon one of the steering knuckle spindles of the vehicle. The forward extremities of the runners are coupled together by a yoke bar 31 connected at its opposite extremities by universal joints with the forward extremities of the runners thus causing both of the runners 26 to turn in unison.

From the foregoing description taken in connection with the accompanying drawings, it will now be seen that the sled attachments may be easily substituted for the steering and driving wheels of a motor vehicle and the traction wheels 9 may be replaced by the driving wheels and may be yieldingly held with any desired pressure in engaging contact with the road surface. This pressure may be regulated to suit different loads imposed on the vehicle. It will further be seen that the sled attachments are adapted to rock in a fore and aft direction to conform to any irregularities or undulations in the road surface.

I claim:—

1. A sled attachment for a motor vehicle, embodying in combination with a vehicle driving axle, a runner having a wheel receiving recess therein, and clearance recesses intersecting the first named recess, a housing extending upwardly from said runner and formed with recesses to receive the driving axle, a traction wheel fast on said axle, an arcuate hood extending from said housing over the traction wheel, a supporting member laterally offset from said hood and having a rocker bearing surface above the hood, a superimposed bolster having a recess to receive said rocker bearing, a stem extending downwardly from said supporting member, a tubular guide having a saddle at its lower end resting upon the driving axle, a nut threaded and adjustable on said stem, and a compression spring interposed between said nut and the upper end of said tubular guide.

2. A sled attachment for a motor vehicle, embodying in combination with a vehicle driving axle, a runner having a wheel receiving recess therein, and clearance recesses intersecting the first named recess, a housing extending upwardly from said runner and formed with recesses to receive the driving axle, a traction wheel fast on said axle, an arcuate hood extending from said housing over the traction wheel, a supporting member laterally offset from said hood and having a rocker bearing surface above the hood, a superimposed bolster having a recess to receive said rocker bearing, a stem extending downwardly from said supporting member, a tubular guide having a saddle at its lower end resting upon the driving axle, a nut threaded and adjustable on said stem, and a compression spring interposed between said nut and the upper end of said tubular guide, said housing being formed in one of the end walls thereof with an opening, for the purpose specified.

In testimony whereof I affix my signature.

EARL G. LIDDY.

Copies of this patent may be obtained for five cents each, by addressing the "Commissioner of Patents, Washington, D. C."